United States Patent [19]

Yamada et al.

[11] Patent Number: 4,837,081
[45] Date of Patent: Jun. 6, 1989

[54] MAGNETIC RECORDING MEDIUM

[75] Inventors: Yasuyuki Yamada; Hajime Miyatsuka; Tsutomu Okita; Nobuo Tsuji, all of Kanagawa, Japan

[73] Assignee: Fuji Photo Film Co., Ltd., Kanagawa, Japan

[21] Appl. No.: 39,123

[22] Filed: Apr. 16, 1987

[30] Foreign Application Priority Data

Apr. 16, 1986 [JP] Japan .................................. 61-85858

[51] Int. Cl.$^4$ ............................................. G11B 5/70
[52] U.S. Cl. .................................... 428/329; 427/128; 428/412; 428/425.9; 428/694; 428/900
[58] Field of Search ............ 428/329, 694, 900, 425.9, 428/412; 427/128

[56] References Cited

U.S. PATENT DOCUMENTS

| | | | |
|---|---|---|---|
| 4,316,927 | 2/1982 | Kimura et al. | 428/694 |
| 4,439,486 | 3/1984 | Yamada et al. | 428/694 |
| 4,562,117 | 12/1985 | Kikukawa et al. | 428/694 |
| 4,568,611 | 2/1986 | Aminsakis et al. | 428/694 |
| 4,568,612 | 2/1986 | Lehner et al. | 428/694 |
| 4,643,949 | 2/1987 | Kolycheck et al. | 428/694 |
| 4,687,704 | 8/1987 | Miyoshi et al. | 428/694 |

*Primary Examiner*—Paul J. Thibodeau
*Attorney, Agent, or Firm*—Sughrue, Mion, Zinn, Macpeak & Seas

[57] ABSTRACT

A magnetic recording medium is described, comprising a non-magnetic support having provided thereon a magnetic layer containing $CrO_2$ fine particles and a binder, wherein the binder comprises polycarbonate polyurethane in an amount of from about 30 to about 90 wt %, based on the total weight of said binder.

5 Claims, No Drawings

MAGNETIC RECORDING MEDIUM

FIELD OF THE INVENTION

The present invention relates to a magnetic recording medium containing $CrO_2$ magnetic particles and an improved binder, and more particularly relates to a magnetic recording medium having excellent hydrolysis resistance of the binder employed, particularly under conditions whereby the magnetic recording medium may be subjected to high temperatures and/or high humidity. The magnetic recording medium also possesses excellent electromagnetic properties and running durability.

BACKGROUND OF THE INVENTION

With recent increases in the efficiency of magnetic recording media, there has been a concomitant demand for higher density recording. This demand has created a renewed interest in $CrO_2$, in addition to metal and Ba ferrite, as ferromagnetic particles. Attention has been particularly drawn to $CrO_2$, since $CrO_2$ has excellent magnetic properties such that (1) saturation magnetization is high; (2) electric resistance is small; (3) demagnetization under pressure is small; (4) the direction of crystal anisotropy axis and the shape of the anisotropy axis are very close; and that (5) Curie point can be varied.

Binders which may be used in such conventional magnetic recording media containing $CrO_2$ magnetic particles include polyurethane mainly composed of an aliphatic polyester polyol component and a polyisocyanate component, as disclosed, for example, in U.S. Pat. No. 4,568,611.

However, this type of conventional magnetic recording medium containing $CrO_2$ fine particles and a polyurethane binder has the undesirable defect that since hydrolysis of polyurethane is accelerated under high temperatures and high humidity, electromagnetic properties and running durability are not satisfactory.

Accordingly, a binder having excellent hydrolysis resistance has been required to prepare magnetic recording media which would ensure the above-described advantageous properties of $CrO_2$ particles.

SUMMARY OF THE INVENTION

Therefore, an object of the present invention is to provide a magnetic recording medium containing $CrO_2$ fine particles as magnetic particles and a binder having excellent hydrolysis resistance, electromagnetic properties and running durability.

With the foregoing problems in mind, the inventors of the present invention have found that the above object can be attained by a magnetic recording medium comprising a non-magnetic support having provided thereon a magnetic layer containing $CrO_2$ particles and a binder, wherein the binder comprises polycarbonate polyurethane in an amount of from about 30 to about 90 wt%, based on the total weight of the binder.

DETAILED DESCRIPTION OF THE INVENTION

The magnetic recording medium of the present invention has a fundamental structure comprising a non-magetic support having provided thereon a magnetic layer containing $CrO_2$ fine particles and a predetermined binder, as described hereafter.

The binder which is used in the present invention with the $CrO_2$ fine particles in the magnetic layer comprises polycarbonate polyurethane in an amount of from about 30 to about 90 wt%, based on the total weight of the binder.

The polycarbonate polyurethane which is used in the present invention is obtained by reacting (1) a polyol, (2) a polyisocyanate and, if desired, (3) a chain extending agent.

The polyol which is used to form the polycarbonate polyurethane preferably is a polycarbonate polyol having a molecular weight of from about 300 to about 20,000 and a hydroxyl value of from about 20 to about 300 obtained by a condensation reaction between a polyhydric alcohol represented by formula (I) and phosgene, chloroacetate, dialkylcarbonate or diallylcarbonate:

$$HO-R-OH \qquad (I)$$

wherein R reprsents

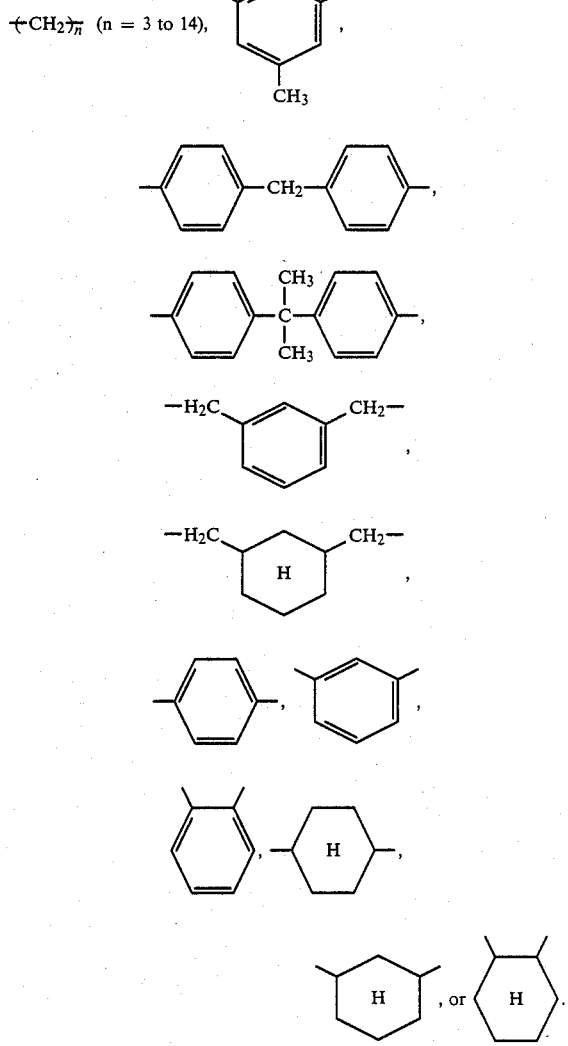

The polyol which is used to form the polycarbonate polyurethane also can be a polycarbonate polyester polyol (having a molecular weight of from about 300 to about 20,000 and a hydroxyl value of from about 5 to about 300) obtained by a condensation reaction between the above-described polycarbonate polyol and a polyhydric carboxylic acid represented by formula (II):

HOOCR'COOH  (II)

wherein R' represents

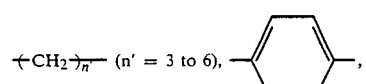

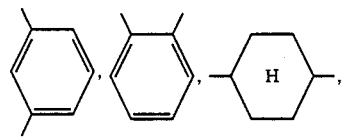

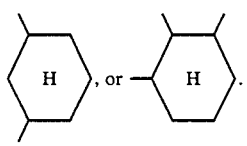

The polyisocyanate which is used to form the polycarbonate polyurethane preferably is selected from hexamethylene diisocyanate, lysine diisocyanate, isophorone diisocyanate, xylylene diisocyanate, cyclohexane diisocyanate, toluidine diisocyanate, 2,4-tolylene diisocyanate, 2,6-tolylene diisocyanate, 4,4'-diphenylmethane diisocyanate, p-phenylene diisocyanate, m-phenylene diisocyanate or 1,5-naphthylene diisocyanate. Among these, 2,4-tolylene diisocyanate, 2,6-tolylene diisocyanate and 4,4'-diphenylmethane diisocyanate are particularly preferred.

Conventional chain extending agents may be used, if desired. Suitable chain extending agents include the above-described polyhydric alcohols. Examples of preferred polyhydric alcohols include ethylene glycol, neopentyl glycol, 1,4-butanediol, 1,6-hexanediol, 1,2-propylene glycol, 1,3-butanediol, and diethylene glycol.

The polycarbonate polyurethane comprising the polyol, polyisocyanate, and chain extending agent (if desired) has an average molecular weight of about 10,000 to about 120,000, preferably from about 30,000 to about 100,000, and more preferably from about 40,000 to about 70,000. If the molecular weight is lower than about 10,000, the durability of a tape containing the polycarbonate polyurethane binder of the present invention deteriorates. Also, if the molecular weight exceeds about 120,000, the solubility of the polycarbonate polyurethane resins deteriorates, which is unfavorable from an industrial point of view.

The ratio of a total number of —OH group in the polyol and the chain extending agents to a total number of —NCO group in the polyisocyanate is preferably about 1.0.

These polycarbonate polyurethanes which are used as a binder together with $CrO_2$ fine particles in accordance with the present invention, if desired, are employed with at least one other binder which preferably is a copolymer. Examples of these other binders include a copolymer of vinyl chloride and vinylidene chloride, phenoxy resins, cellulose resins, olefin type synthetic rubbers and polyisocyanate which can be used together with the polycarbonate polyurethane to improve characteristics of a tape.

The polycarbonate polyurethane is preferably used in an amount of from about 30 to about 90 wt%, more preferably from 40 to 85 wt%, based on the total amount of the binders. The other binders can preferably be used in an amount of from about 10 to about 70 wt%, and more preferably from 15 to 60 wt%.

It is important for achieving the goals of the present invention that the polycarbonate polyurethane binder and the other binders are used in the above-described weight ratios. When these binders are used in amounts outside the above ranges, the following problems occur.

When an excess amount of polycarbonate polyurethane is used, coefficient of friction tends to increase. On the other hand, when the other binders are used in an excessive amount, the hydrolysis resistance of the binders under high temperatures and high humidity decreases, resulting in decreasing performance with respect to electromagnetic properties and running durability. More specifically, decrease of outputs, decrease of still durability, bridging of the magnetic head gap, and blocking occur.

The total amount of binders (polycarbonate polyurethane binder and other binder) used in the magnetic layer in the present invention is preferably from about 15 to about 35 wt%, more preferably from about 20 to about 30 wt%, based on the weight of the $CrO_2$ particles. When the total amount of binder is less than about 15 wt%, running durability at a still mode and the like deteriorate. Conversely, when the total amount of binder is more than about 15 wt%, desired electromagnetic properties cannot be obtained in many cases due to low packing density, or the friction coefficient undesirably increases in many cases.

The $CrO_2$ fine particles contained in the magnetic layer of the magnetic recording medium of the present invention have an average length in the long axis of about 1.0 μm or lower, preferably 0.7 μm or lower, and more preferably 0.3 μm or lower. It is also preferred that the $S_{BET}$ specific surface area is about 18 $M^2/g$ or more, and that the particle axis ratio (the long axis/the short axis) is about 7/1 or more, and more preferably from 9/1 to 20/1. Sb, Te, Sn, Ru, P, W and other compounds can be added to the $CrO_2$ particle-containing layer to change the coercive force, while Fe, Ru, S, P, F, V, Mn, V-Ni and other compounds can be added thereto as modifying agents, if desired, as described in, for example, Japanese Patent Publication Nos. 8839/61, 829/63, 18188/63, 5739/72, 21874/73, 9360/74, Japanese patent application (OPI) Nos. 74500/73, 65500/73, 40692/73, 18793/74 (the term "OPI" as used herein refers to a "published unexamined Japanese patent application"), U.S. Pat. No. 3,034,988 and French patent No. 2,108,364.

Conventional non-magnetic supports may be used in the present invention. Materials comprising the non-magnetic supports include films of synthetic resins such as polyethylene terephthalate, polypropylene, polycarbonate, polyethylene naphthalate, polyamide, polyamide imide and polyimide, as well as metal foils such as aluminum foil or stainless steel foil. The thickness of the non-magnetic support is not limited, but is generally from about 3 to about 50 μm, preferably from 5 to 30 μm, and more preferably from 5 to 10 μm.

A backing layer can also be provided on the surface of the non-magnetic support opposite to the surface of the magnetic layer.

Suitable ferromagnetic fine particles, non-magnetic particles, other binders (other than the above-described polycarbonate polyurethane binders), additives, solvents and supports (on which may also be present an underlayer, or a backing layer and an underlayer for the backing layer), as well as methods for preparing a magnetic recording medium of the type described herein, are disclosed in, for example, Japanese Patent Publication Nos. 26890/81, 8046/84, etc.

The present invention is illustrated in more detail by the following Examples and Comparative Examples, which are not to be construed as limiting the present invention in any manner. In Examples and Comparative Examples, all parts, percentages, ratios, and the like are by weight unless otherwise indicated.

EXAMPLES 1 TO 6 AND COMPARATIVE EXAMPLES 1 TO 7

A magnetic coating composition having the following formulation was prepared and coated on a polyethylene terephthalate non-magnetic support having a thickness of 10 μm so that the dry thickness of the magnetic layer was 3.0 μm.

| Formulation of Magnetic Coating Composition: | |
|---|---|
| $CrO_2$ fine particles | 100 parts |
| Urethane resin (polycarbonate polyurethane (as Invention) and polyester polyurethane (as Comparison) as shown in Table 1) | Amounts shown in Table 1 |
| Thermoplastic resin (Third Ingredient in Table 1) | Amounts shown in Table 1 |
| Polyisocyanate ("Collonate L", a trade name, manufactured by Nippon Polyurethane Co., Ltd.) | Amounts shown in Table 1 |
| Carbon black (average particle diameter: 0.04 μm) | 2 parts |
| Behenic acid | 1.5 parts |
| Isotridecyl stearate | 2.3 parts |
| $\alpha$-$Al_2O_3$ (particle diameter: 0.2 μm) | 5.4 parts |
| Methyl ethyl ketone/toluene = (7/3 by weight ratio) | 300 parts |

The non-magnetic support thus coated with the magnetic coating composition was subjected to magnetic orientation while the magnetic coating composition was undried. After the magnetic layer dried on the support, it was subjected to a calendering treatment and slit to a width of ½ inch to manufacture a VHS type video tape.

The reproduced outputs, coefficients of friction, decrease of outputs, reproduction at a still mode and bridging of the magnetic head gap after running of the full length of each sample of video tapes thus obtained were measured, and the results thereof are shown in Table 2 below. Those measurements were conducted under two conditions, that is, at 23° C. and 50% RH (Condition A) and at a higher temperature and higher humidity of 40° C. and 80% RH (Condition B). The reproduced outputs were measured only under Condition A. Table 1 shows the constitution of the specific tapes tested per Examples 1 to 6 and Comparative Examples 1 to 7, whereas Table 2 sets forth the results of the comparative testing.

TABLE 1

| Sample No.* | Average Length in Long Axis of CrO Particles (μm) | Total Amount of Binder to $CrO_2$ (wt %) | Polycarbonate Polyurethane (wt %) | Polyester Polyurethane (wt %) | Third Ingredient (wt %) | Polyisocyanate (wt %) |
|---|---|---|---|---|---|---|
| | | | | | Vinyl chloride and vinyl acetate resin | |
| E-1 | 0.7 | 25 | 60 | — | 23 | 17 |
| E-2 | 0.4 | 20 | 60 | — | 23 | 17 |
| C-1 | 0.7 | 25 | — | 60 | 23 | 17 |
| C-2 | 0.4 | 20 | — | 60 | 23 | 17 |
| C-3 | 0.7 | 25 | 95 | — | 3 | 2 |
| C-4 | 0.7 | 25 | 5 | — | 70 | 25 |
| C-5 | 0.7 | 25 | 20 | — | 70 | 10 |
| | | | | | Vinyl chloride and vinylidene copolymer | |
| E-3 | 0.7 | 30 | 70 | — | 20 | 10 |
| E-4 | 0.4 | 21 | 70 | — | 20 | 10 |
| C-6 | 0.7 | 30 | — | 70 | 20 | 10 |
| C-7 | 0.4 | 21 | — | 70 | 20 | 10 |
| E-5 | 0.4 | 17 | 50 | — | 35 | 15 |
| E-6 | 0.4 | 17 | 90 | — | 6 | 4 |

*E: Example,
C: Comparative Example

TABLE 2

| Sample No.* | Reproduced Output A** (dB) | Friction Coefficient A** | Friction Coefficient B** | Decrease of Output A** (dB) | Decrease of Output B** (dB) | Still Life A** (min.) | Still Life B** (min.) | Occurrence of Bridging of the Magnetic Head Gap A** | Occurrence of Bridging of the Magnetic Head Gap B** |
|---|---|---|---|---|---|---|---|---|---|
| E-1 | +3.5 | 0.20 | 0.23 | 0.8 | 0.9 | More than 60 | More than 60 | No occurrence | No occurrence |
| E-2 | +3.0 | 0.21 | 0.24 | 0.8 | 0.8 | " | " | " | " |
| C-1 | +2.0 | 0.21 | 0.26 | 0.8 | 2.5 | " | 18 | " | Occurrence |
| C-2 | +2.3 | 0.20 | 0.24 | 0.8 | 2.7 | " | 15 | " | " |
| C-3 | +0 | 0.38 | 0.39 | 0.7 | 0.9 | " | More than 60 | " | No occurrence |
| C-4 | +1.5 | 0.21 | 0.23 | 0.8 | 2.5 | " | 17 | " | Occurrence |
| C-5 | +1.0 | 0.22 | 0.24 | 0.7 | 2.8 | " | 13 | " | " |
| E-3 | +2.7 | 0.20 | 0.22 | 0.8 | 0.9 | " | More than 60 | " | No occurrence |

TABLE 2-continued

| Sample No.* | Reproduced Output A** (dB) | Friction Coefficient A** | Friction Coefficient B** | Decrease of Output A** (dB) | Decrease of Output B** (dB) | Still Life A** (min.) | Still Life B** (min.) | Occurrence of Bridging of the Magnetic Head Gap A** | Occurrence of Bridging of the Magnetic Head Gap B** |
|---|---|---|---|---|---|---|---|---|---|
| E-4 | +2.6 | 0.21 | 0.22 | 0.8 | 0.9 | " | " | " | " |
| C-6 | +2.1 | 0.21 | 0.23 | 0.9 | 2.8 | " | 12 | " | Occurrence |
| C-7 | +2.0 | 0.21 | 0.24 | 0.9 | 2.9 | " | 8 | " | " |
| E-5 | +3.2 | 0.22 | 0.23 | 0.7 | 0.9 | " | More than 60 | " | No occurrence |
| E-6 | +3.2 | 0.24 | 0.25 | 0.6 | 0.8 | " | " | " | " |

**Condition A: 23° C., 50% RH.
Condition B: 40° C., 80% RH

The test results of comparative testing shown above were obtained according to the following test procedures.

Reproduced Outputs

The reproduced outputs at a recording wavelength of 0.7 μm of the thus obtained video tapes running repeatedly at half of the normal speed were measured using a video tape recorder (VTR) "V 500 D", a trade name, manufactured by Toshiba Corporation, equipped with a ferrite head. The values of reproduced outputs are relative values when the reproduced output of Comparative Example 3 is defined as 0 dB.

Friction Coefficient

Tapes having made 10 runs on VTR were used for this measurement. Friction coefficient was measured by moving the tapes at a speed of 1.5 cm/sec with the surface of the magnetic layer contacting the SUS pole at an angle of 180° and the friction coefficient μ was calculated by the following equation:

$$\mu = \frac{1}{\pi} \ln \frac{T_2}{T_1}$$

wherein $T_1$ is a tape tension of 50 g at the supply side and $T_2$ is the tape tension read at the take-up side.

Decrease of Outputs

After an initial 30 min. length of T-120 tape was repeatedly run for 500 runs on the VTR, the decrease of the reproduced output was measured.

Still Life

Reproduction was conducted on a still mode and reproduced RF output level was measured by a recorder. The still life is indicated in terms of the time (min.) until when the signal level was decreased to half of the initial signal level. A tape having a still life value of more than 60 min. is acceptable.

Bridging of the Magnetic Head Gap after Running of Tape for Full Length

Whether signals recorded before testing did not appear on a monitor because of bridging of the magnetic head gap was observed by running a tape of T-120 for full length for 300 runs.

It is apparent from the results shown in Table 2 that when Examples 1, 2, 3, and 4, and Comparative Examples 1, 2, 6, and 7 are directly compared, tapes prepared by using conventional polyester polyurethane binder show a decrease of output, poor still life and occurrence of bridging of the magnetic head gap under conditions of 40° C. and 80% RH (Condition B), whereas tapes prepared by using polycarbonate polyurethane binders containing the amounts required by the present invention do not exhibit the above-described deteriorations. Further, it is observed upon direct comparison between the results of Examples 1 to 6 and Comparative Examples 3 to 5 that the amounts of binder components are predetermined as shown in Table 1, and that when the additive amount of the polycarbonate polyurethane component exceeds 90 wt% based on the total weight of the binder, the coefficient of friction undesirably increases (e.g., Comparative Example 3). On the other hand, when the amount of the polycarbonate polyurethane component is less than 30 wt% based on the total weight of the binder (e.g., Comparative Examples 4 and 5), decrease of output, poor still life and bridging of the magnetic head gap occur under the atmosphere of at 40° C. and 80% RH (Condition B).

It is clear from the above results that the magnetic recording medium of the present invention exhibits remarkably reduced deterioration of electromagnetic properties and running durability due to high resistance to hydrolysis of the binder when the medium is allowed to stand at a resulting high temperature and high humidity for a long time. Accordingly, in accordance with the present invention, a magnetic recording medium having excellent properties such as reduced decrease of output, excellent still durability and slight bridging of the magnetic head gap and blocking can be obtained.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having provided thereon a magnetic layer containing $CrO_2$ fine particles and a binder, wherein the binder comprises a polycarbonate polyurethane, a copolymer of vinyl chloride, and a polyisocyanate in an amount of from about 50 to about 90 wt%, from 6 to 35 wt% and from 4 to 17 wt%, respectively, based on the total weight of said binder, wherein said polycarbonate polyurethane further comprises a chain extending agent and has an average molecular weight of about 10,000 to about 120,000, wherein said $CrO_2$ fine particles have an average length in the long axis of about 1.0 μm or less, and $S_{BET}$ specific surface area of about 18 M²/g or more and a particle axis ratio of about 7/1 or more, said binder being present in an amount of from about 15 to 35 wt% based on the weight of said $CrO_2$ fine particles.

2. A magnetic recording medium as claimed in claim 1, wherein said polycarbonate polyurethane is obtained by reacting a polyol and a polyisocyanate.

3. A magnetic recording medium as claimed in claim 1, wherein said polycarbonate polyurethane is present in an amount of from 50 to 85 wt%, based on the total weight of said binder.

4. A magnetic recording medium as claimed in claim 1, wherein said binder is present in an amount of from 20 to 30 wt% based on the weight of said $CrO_2$ fine particles.

5. A magnetic recording medium as claimed in claim 1, wherein the copolymer of vinyl chloride is a vinyl chloride - vinyl acetate copolymer.

* * * * *